(12) United States Patent
Yamada et al.

(10) Patent No.: US 11,779,881 B2
(45) Date of Patent: Oct. 10, 2023

(54) DEHUMIDIFYING ELEMENT, DEHUMIDIFYING DEVICE, AND A METHOD OF MANUFACTURING DEHUMIDIFYING ELEMENT

(71) Applicant: Mitsubishi Electric Corporation, Tokyo (JP)

(72) Inventors: Shota Yamada, Tokyo (JP); Akinori Shimizu, Tokyo (JP); Yoko Matsuura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/920,041

(22) PCT Filed: Jun. 11, 2020

(86) PCT No.: PCT/JP2020/023018
§ 371 (c)(1),
(2) Date: Oct. 20, 2022

(87) PCT Pub. No.: WO2021/280849
PCT Pub. Date: Dec. 16, 2021

(65) Prior Publication Data
US 2023/0146349 A1    May 11, 2023

(51) Int. Cl.
*B01D 53/02* (2006.01)
*B01D 53/28* (2006.01)
(Continued)

(52) U.S. Cl.
CPC ........... *B01D 53/28* (2013.01); *B01D 53/261* (2013.01); *F24F 3/1411* (2013.01); *B01D 2253/304* (2013.01); *F24F 2003/144* (2013.01)

(58) Field of Classification Search
CPC ............. B01D 53/28; B01D 53/261; B01D 2253/304; F24F 3/1411; F24F 2003/144
See application file for complete search history.

(56) References Cited

U.S. PATENT DOCUMENTS 3,800,515 A * 4/1974 Asker .................... F28F 25/08
                                                 55/498
4,341,539 A * 7/1982 Gidaspow ............. F24F 3/1411
                                                 62/271
(Continued)

FOREIGN PATENT DOCUMENTS

CN      101233381 A    7/2008
CN      102120124 A    7/2011
(Continued)

OTHER PUBLICATIONS

International Search Report and Written Opinion dated Jul. 28, 2020, received for PCT Application PCT/JP2020/023018, filed on Jun. 11, 2020, 8 pages including English Translation.
(Continued)

*Primary Examiner* — Christopher P Jones
(74) *Attorney, Agent, or Firm* — XSENSUS LLP

(57) ABSTRACT

A dehumidifying element includes: a layered body in which a plurality of sheets supporting an adsorbent that dehumidifies air are stacked on one another, with gaps provided between adjacent ones of the plurality of sheets, the gaps allowing air to pass therethrough; a casing that holds the layered body; and a cushioning member provided between the casing and the layered body in a stacking direction in which the plurality of sheets are stacked on one another, the cushioning member being configured to expand and contract.

19 Claims, 7 Drawing Sheets

(51) Int. Cl.
*B01D 53/26* (2006.01)
*F24F 3/14* (2006.01)

(56) References Cited

U.S. PATENT DOCUMENTS

| | | | | |
|---|---|---|---|---|
| 5,478,379 | A * | 12/1995 | Bevins | B01D 46/10 |
| | | | | 96/138 |
| 5,494,642 | A | 2/1996 | Sanada | |
| 9,140,460 | B2 * | 9/2015 | Woods | F24F 1/0059 |
| 2009/0126898 | A1 * | 5/2009 | Eplee | F28D 21/0015 |
| | | | | 165/10 |
| 2009/0229461 | A1 * | 9/2009 | Jeng | F24F 3/1423 |
| | | | | 62/271 |
| 2010/0319370 | A1 * | 12/2010 | Kozubal | F24F 3/1417 |
| | | | | 62/271 |
| 2012/0192864 | A1 * | 8/2012 | Galbraith | B01D 53/26 |
| | | | | 96/111 |
| 2013/0319250 | A1 * | 12/2013 | Becze | F25B 17/02 |
| | | | | 96/242 |
| 2016/0030918 | A1 * | 2/2016 | Kaimoto | B01J 20/28026 |
| | | | | 428/317.1 |
| 2021/0138436 | A1 * | 5/2021 | Liu | B01D 46/24 |
| 2022/0387972 | A1 * | 12/2022 | Shimizu | B01J 20/267 |

FOREIGN PATENT DOCUMENTS

| | | |
|---|---|---|
| JP | 7-189662 A | 7/1995 |
| JP | 2005-58874 A | 3/2005 |
| JP | 2005-274181 A | 10/2005 |
| JP | 2015-21670 A | 2/2015 |
| JP | 2015-213875 A | 12/2015 |
| JP | 6636053 B2 | 1/2020 |
| WO | 2017/109952 A1 | 6/2017 |
| WO | 2017/130403 A1 | 8/2017 |

OTHER PUBLICATIONS

Decision to Grant dated Oct. 6, 2020, received for JP Application 2020-545818, 5 pages including English Translation.
Office Action dated May 19, 2023 in corresponding Chinese Patent Application No. 202080101908.5 and Machine English Translation thereof, 14 pages.

* cited by examiner

DEHUMIDIFYING ELEMENT, DEHUMIDIFYING DEVICE, AND A METHOD OF MANUFACTURING DEHUMIDIFYING ELEMENT

CROSS-REFERENCE TO RELATED APPLICATION

The present application is based on PCT filing PCT/JP2020/023018, filed Jun. 11, 2020, the entire contents which is incorporated herein by reference.

TECHNICAL FIELD

The present disclosure relates a dehumidifying element, a dehumidifying device provided with the dehumidifying element, and a method of manufacturing the dehumidifying element.

BACKGROUND ART

In the past, dehumidifying elements that dehumidify air have been known. Such a dehumidifying element has a layered body in which plural sheets having a wavy shape and a planar shape are alternately stacked on each other. In addition, the layered body is fitted into a casing, and the outer shape of the layered body is thus fixed. Patent Literature 1 discloses a dehumidifying device provided with such a dehumidifying element as described above.

CITATION LIST

Patent Literature

Patent Literature 1: Japanese Patent No. 6636053

SUMMARY OF INVENTION

Technical Problem

In general, each of sheets that form a layered body is a fibrous sheet and supports an adsorbent that adsorbs and desorbs moisture in air. The layered body expands when the adsorbent adsorbs moisture, and contracts when the adsorbent desorbs moisture. The adsorbent does not easily expand in a direction parallel to surfaces of the sheets since its expansion is restricted by the fibers of the sheets and portions of the adsorbent interfere with each other. By contrast, the adsorbent easily expands in a stacking direction where the sheets are stacked together, since no object that interferes with the adsorbent is present in the stacking direction. That is, the layered body easily expands in the stacking direction.

Thus, when the layered body that has been fitted into the casing and fixed expands, a great load is applied to the layered body in the stacking direction because of the expansion of the sheets. Therefore, there is a possibility that the great load applied from the casing to the layered body in the stacking direction will break the layered body. In Patent Literature 1, it is described that the material and the thickness of a casing are adjusted in consideration of the expansion of a layered body. However, the casing of Patent Literature 1 does not intend to reduce the probability that the layered body will be broken.

The present disclosure is applied to solve such a problem as descried above, and relates to a dehumidifying element that is made in such a manner as to reduce the probability with which a layered body will be broken.

Solution to Problem

A dehumidifying element of an embodiment of the present disclosure includes: a layered body in which a plurality of sheets supporting an adsorbent that dehumidifies air are stacked on one another, with gaps provided between adjacent ones of the plurality of sheets, the gaps allowing air to pass therethrough; a casing that holds the layered body; and a cushioning member provided between the casing and the layered body in a stacking direction in which the plurality of sheets are stacked on one another, the cushioning member being configured to expand and contract.

Advantageous Effects of Invention

According to an embodiment of the present disclosure, the dehumidifying element includes the cushioning member provided between the casing and the layered body in the stacking direction. Thus, when the layered body expands, a force of the layered body that presses the casing in the stacking direction of the sheets is reduced. That is, when the layered body expands and the casing holds the layered body, the load applied to the layered body in the stacking direction of the sheets is reduced. Therefore, in the dehumidifying element, the probability with which the layered body will be broken is reduced.

DESCRIPTION OF EMBODIMENTS

Embodiment 1

Figure 1:
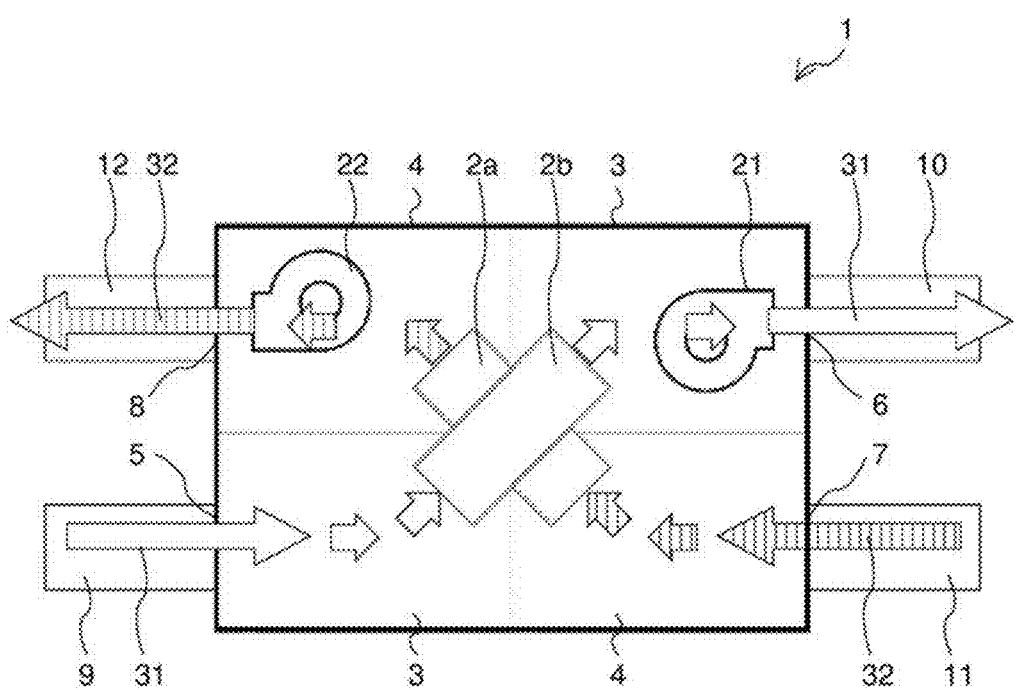
FIG. 1 illustrates a configuration of a dehumidifying device 1 according to Embodiment 1.

FIG. 1 illustrates the configuration of a dehumidifying device 1 according to Embodiment 1. The dehumidifying device 1 is provided, for example, at a duct, and dehumidifies air that passes through the duct. In the dehumidifying device 1, a first air passage 3 and a second air passage 4 are provided. In the first air passage 3, a first dehumidifying element 2a is provided, and in the second air passage 4, a second dehumidifying element 2b is provided. The first dehumidifying element 2a and the second dehumidifying element 2b dehumidify air having a relatively high humidity and humidify air having a relatively low humidity. It should be noted that "dehumidifying element 2" in the following description is a generic term for the first dehumidifying element 2a and the second dehumidifying element 2b. The dehumidifying element 2 may be applied to a device other than the dehumidifying device 1 of Embodiment 1.

The dehumidifying device 1 has a first inflow port 5, a first outflow port 6, a second inflow port 7, and a second outflow port 8. The first inflow port 5 communicates with an outside air duct 9 through which outdoor air flows from the outside of a room to the dehumidifying device 1. The first outflow port 6 communicates with an air-supply duct 10 through which outdoor air flows from the dehumidifying device 1 to the inside of the room. The second inflow port 7 communicates with a return air duct 11 through which indoor air flows from the inside of the room to the dehumidifying device 1. The second outflow port 8 communicates with an exhaust duct 12 through which indoor air flows from the dehumidifying device 1 to the outside of the room.

The dehumidifying device 1 further includes an air-supply fan 21 and an exhaust fan 22. The exhaust fan 22 sends air from the second inflow port 7 toward the exhaust duct 12. The air-supply fan 21 sends air from the first outflow port 6, from the outside of the room, toward the inside the room.

The dehumidifying device 1 switches the state of each of the first air passage 3 and the second air passage 4 between a first state and a second state. In the first state, the first air passage 3 communicates with the first inflow port 5 and the first outflow port 6, and the second air passage 4 communicates with the second inflow port 7 and the second outflow port 8. In the second state, the first air passage 3 communicates with the second inflow port 7 and the second outflow port 8, and the second air passage 4 communicates with the first inflow port 5 and the first outflow port 6.

The flow of air in the first state will be described. In the first air passage 3, a first air 31 from the outside of the room flows through the outside air duct 9. When passing through the first dehumidifying element 2, the first air 31 is dehumidified. The dehumidified first air 31 flows through the air-supply duct 10 and is supplied into the room. In the second air passage 4, a second air 32 from the inside of the room flows through the return air duct 11. When passing through the second dehumidifying element 2b, the second air 32 is humidified. The humidified second air 32 flows through the exhaust duct 12 and is exhausted to the outside of the room.

The flow of air in the second state will be described. In the first air passage 3, the second air 32 from the inside of the room flows through the return air duct 11. When passing through the second dehumidifying element 2b, the second air 32 is humidified. The humidified second air 32 flows through the exhaust duct 12 and is exhausted to the outside of the room. In the second air passage 4, the first air 31 from the outside of the room flows through the outside air duct 9. When passing through the first dehumidifying element 2a, the first air 31 is dehumidified. The dehumidified first air 31 flows through the air-supply duct 10 and is supplied into the room.

While one of the first dehumidifying element 2a and the second dehumidifying element 2b dehumidifies the first air 31, the other dehumidifying element humidifies the second air 32 and can restore its dehumidification capacity, since moisture is desorbed from the other dehumidifying element. In the dehumidifying device 1, of the first dehumidifying element 2a and the second dehumidifying element 2b, the dehumidifying element that re-has the dehumidification capacity is used to dehumidify the first air 31 that flows from the outside of the room, by switching of the state of each of the first air passage 3 and the second air passage 4 between the first and the second state. Thus, the dehumidifying device 1 can continuously supply dehumidified air into the room.

Configuration of Dehumidifying Element 2

Figure 2:
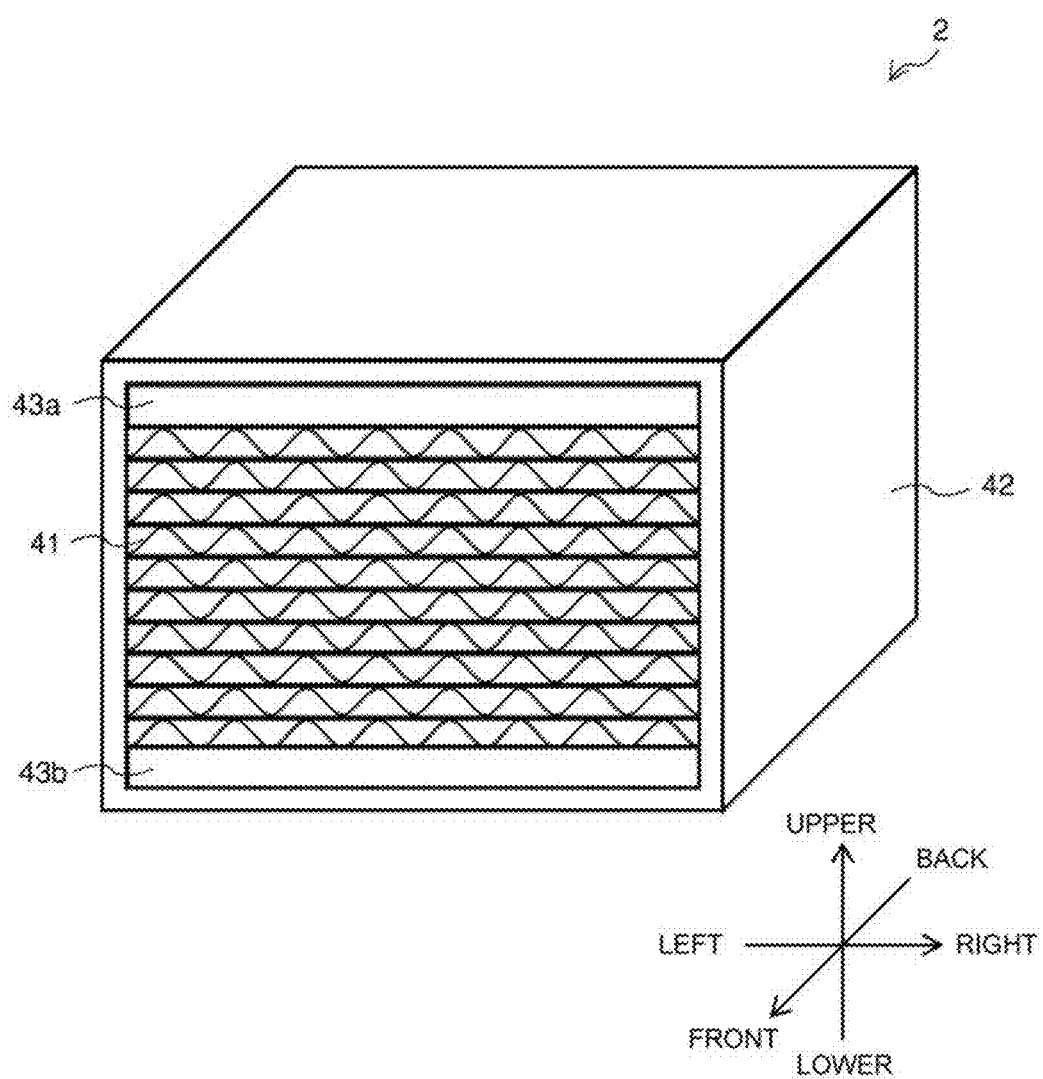
FIG. 2 is a perspective view of a dehumidifying element 2 according to Embodiment 1.

FIG. 2 is a perspective view of the dehumidifying element 2 according to Embodiment 1. The dehumidifying element 2 includes a layered body 41, a casing 42, a cushioning member 43a, and a cushioning member 43b. It should be noted that "cushioning member 43" in the following description is a generic term for the cushioning member 43a and the cushioning member 43b. The dehumidifying elements 2 are provided in the dehumidifying device 1 such that a stacking direction, which will be described later, coincides with an up-and-down direction of the dehumidifying device 1.

In the layered body 41, a plurality of sheets having a wavy shape and a plurality of sheets having a planar shape, that is, wavy sheets and planar sheets, are alternately stacked on one another. Hereinafter, a direction in which the sheets of the layered body 41 are stacked on one another will be referred to as the stacking direction. In addition, a direction orthogonal to the stacking direction will be referred to as an end portion direction. The end portion direction corresponds to a lateral direction of the dehumidifying element 2. The sheets of the layered body 41 extend in the end portion direction. Also, a direction orthogonal to the stacking direction and to the end portion direction will be referred to as an air-flow direction. The air-flow direction corresponds to a front-back direction of the dehumidifying element 2. Between the adjacent ones of the wavy sheets and the planar sheets, gaps are provided to allow air to flow in the air-flow direction. It should be noted that the sheets that form along with the planar sheets the layered body 41 are not limited to the wavy sheets. The sheets may be, for example, knurled by an embossing roller or other tools. In addition, the layered body 41 may include only the wavy sheets or only knurled sheets. Also, in this case, the sheets are stacked on one another, with gaps provided between any adjacent ones of the sheets.

In each of sheets that form the layered body 41, an adsorbent that dehumidifies air is supported by a sheet base material. The sheet base material is made of, for example, paper. It should be noted that the sheet base material may be selected from materials such as a nonwoven fabric base material made of polypropylene, polyethylene, polystyrene, polyester, or rayon, a metallic fiber nonwoven fabric made of a highly thermally conductive metal, such as, aluminum or copper, and a resin fiber nonwoven fabric. In addition, the sheet base material has minute pores between fibers that form the sheet base material. Air sent to the dehumidifying element 2 passes through pores of the sheet base material, and the air is diffused throughout the sheet. When the air is quickly diffused into the pores of the sheet base material, the contact between the air and the adsorbent supported on surfaces of the fibers in the sheet is promoted, and the speed of adsorption is thus increased, whereby a satisfactory adsorption performance is achieved. It should be noted that hydrophilic fibers may be used for the sheet base material, or the sheet base material may be subjected to a hydrophilization treatment. In the case of using such a material, the sheet base material has higher wettability and can thus support more efficiently the adsorbent on the surfaces of the fibers.

The adsorbent is, for example, a material that adsorbs and desorbs moisture in the air, and is made of a high molecular compound such as a polyacrylic acid salt and an inorganic compound such as a silica gel. The adsorbent is applied on a surface of the sheet base material, or the inside of the sheet base material is impregnated with the adsorbent. The adsorbent can be contained in the sheet base material, for example, by the following way: fibers and the adsorbent are mixed with each other to form a sheet-shaped nonwoven fabric or the adsorbent is mixed into paper. In the case where an adsorbent of dispersion liquid or of solution is used, the adsorbent may be applied onto the sheet base material, or paper or nonwoven fabric may be impregnated with the adsorbent. In the case where a fibrous adsorbent is used, the adsorbent itself may be fibers that form paper or nonwoven fabric. The sequence of a step of causing the sheet to support the adsorbent and a step of processing the sheet to form it into a wavy shape are adjusted in consideration of, for example, the workability of the sheet or the workability for adding the adsorbent.

The layered body 41 expands when the adsorbent adsorbs moisture. The layered body 41 contracts when the adsorbent desorbs moisture. The adsorbent does not easily expand in the end portion direction since its expansion is restricted by the fibers of the sheets and portions of the adsorbent interfere with each other. By contrast, the adsorbent easily expands in the stacking direction, in which an object that interferes with the adsorbent is absent. That is, the layered body 41 easily expands in the stacking direction.

The casing 42 is a frame body having a substantially rectangular shape and is open in the front-back direction. It should be noted that the shape of the casing 42 is not limited to the rectangular shape. The casing 42 may have a polygonal shape, a circular shape, or an oval shape. In addition, the material of the casing 42 is selected from various materials such as plastic, metal, and wood, based on the temperature and humidity of air and the speed of wind.

Each of the cushioning members 43 is a member that expands and contracts, and is, for example, a sponge sheet, a rubber sheet, or a binder. The material, the shape, or dimensions of the cushioning member 43 are adjusted appropriately. The cushioning member 43 has low air permeability. In addition, the air permeability of the cushioning member 43 does not change even when the cushioning member 43 expands and contracts. Thus, in the dehumidifying element 2, a decrease in the dehumidification performance is reduced because air passes through the cushioning member 43 which does not contribute to dehumidification. It should be noted that the cushioning member 43 may have hygroscopicity.

The casing 42 holds the layered body 41 and the cushioning members 43 in the up-and-down direction and in the lateral direction. Thus, the outer shape of the layered body 41 is fixed. Each of the cushioning members 43 is provided between the layered body 41 and the casing 42 in the up-and-down direction and is bonded to the layered body 41 and the casing 42. More specifically, the cushioning member 43a is bonded to an upper surface of the layered body 41, and the cushioning member 43b is bonded to a lower surface of the layered body 41. An upper end portion of the cushioning member 43a is bonded to an inner surface of an upper portion of the casing 42, and a lower end portion of the cushioning member 43b is bonded to an inner surface of a lower portion of the casing 42. Thus, even when the layered body 41 expands and contracts repeatedly, gaps are not easily formed between the cushioning member 43a and the upper surface of the layered body 41 and between the cushioning member 43a and the inner surface of the upper portion of the casing 42. Also, even when the layered body 41 expands and contracts repeatedly, gaps are not easily formed between the cushioning member 43b and the lower surface of the layered body 41 or between the cushioning member 43b and the inner surface of the lower portion of the casing 42. It should be noted that only one of the cushioning member 43a, which is provided on the upper surface of the layered body 41, and the cushioning member 43b, which is provided on the lower surface of the layered body 41, may be provided as the cushioning member 43. In addition, it is not indispensable that the cushioning members 43 are bonded to the layered body 41 and the casing 42 that are adjacent to the cushioning members 43 in the up-and-down direction. In the case where the cushioning members 43 are not bonded to the layered body 41 or the casing 42, the cushioning member 43a also contracts and expands in accordance with the upward expansion and the contraction of the layered body 41; and the cushioning member 43b contracts and expands in accordance with the downward expansion and the contraction of the layered body 41. It should be noted that the casing 42 may hold the layered body 41 and the cushioning members 43 in a direction oblique to the stacking direction or to the end portion direction.

In addition, the movement of the layered body 41 and that of each of the cushioning members 43 in the front-back direction are limited. In the air-flow direction, the dimension of the casing 42 is larger than or equal to that of the layered body 41 at time at which the layered body 41 most greatly expands. Thus, the layered body 41 does not interfere with the first air passage 3 or the second air passage 4.

End portions of the cushioning member 43 in the lateral direction are not bonded to the casing 42. Thus, the end portions of the cushioning member 43 in the lateral direction, that is, the end portions thereof that are adjacent to the casing 42, can be moved along the casing 42 in the up-and-down direction when the layered body 41 expands and contracts. It should be noted that in another embodiment, the cushioning member 43 may be bonded to the casing 42 in the lateral direction. Also, end portions of the layered body 41 in the lateral direction are not bonded to the casing 42. Thus, the layered body 41 can be moved along the casing 42 in the up-and-down direction when the layered body 41 expands and contracts. It should be noted that in another embodiment, the layered body 41 may be bonded to the casing 42 in the lateral direction.

Method of Manufacturing Dehumidifying Element 2

A method of manufacturing the dehumidifying element 2 will be described. First, a layered-body preparing step of preparing the layered body 41 having the wavy sheets and the planar sheets that are stacked on one another is carried out. Next, a first bonding step of bonding the cushioning member 43a to the upper surface of the layered body 41 is carried out. Subsequently, a second bonding step of bonding the cushioning member 43b to the lower surface of the layered body 41 is carried out. Then, a setting step of setting the layered body 41 and the cushioning members 43 in the casing 42 is carried out. At this time, the casing 42 and the cushioning members 43 are bonded to each other. In such a manner, the dehumidifying element 2 is manufactured. It should be noted that the sequence of the first bonding step and the second bonding step may be changed appropriately.

The layered-body preparing step will be described in detail. First, a planar sheet is squeezed using, for example, a corrugating machine or a rack and a pinion, thereby forming a wavy sheet. Next, a planar sheet is laid on the wavy sheet to make a pair of sheets having the shape of a single-face corrugated board. Such single-face corrugated board-shaped sheets are then stacked on one another to form the layered body 41.

It should be noted that when each of the cushioning members 43 is not bonded to the layered body 41 or the casing 42, subsequent to the layered-body preparing step, a layered body setting step of setting only the layered body 41 in the casing 42 is carried out. Next, a first cushioning-member setting step of setting the cushioning member 43a on the upper surface of the layered body 41 is carried out. Then, a second cushioning-member setting step of setting the cushioning member 43b on the lower surface of the layered body 41 is carried out. In such a manner, the dehumidifying element 2 is manufactured. It should be noted that the sequence of the steps of setting and bonding of the cushioning members 43 may be changed appropriately.

In Embodiment 1, the dehumidifying element 2 includes the cushioning members 43 each of which is provided between the casing 42 and the layered body 41 in the stacking direction. Thus, when the layered body 41 expands, the force of the layered body 41 that presses the casing 42 in the stacking direction of the sheets is cushioned. That is, when the casing 42 holds the expanding layered body 41, the load applied to the layered body 41 in the stacking direction of the sheets is reduced. Consequently, in the dehumidifying element 2, the probability with which the layered body 41 will be broken is reduced.

The cushioning member 43 contracts when the layered body 41 expands in the stacking direction. Thus, in the dehumidifying element 2, a region occupied by the layered body 41 is increased. Therefore, in the dehumidifying element 2, even when the layered body 41 expands, the space between any adjacent ones of the sheets of the layered body 41 is hardly narrowed. Thus, the dehumidifying element 2 reduces the pressure loss of air that passes through the dehumidifying element 2. In addition, the cushioning member 43 expands when the layered body 41 contracts in the stacking direction, thereby maintaining the contact between the layered body 41 and the casing 42. Thus, gaps are not easily formed between the layered body 41 and the cushioning member 43 or between the casing 42 and the cushioning member 43. Thus, air that passes through the dehumidifying element 2 easily flows to the layered body 41, and the dehumidification performance of the dehumidifying element 2 is thereby improved.

In addition, according to Embodiment 1, the layered body 41 and each of the cushioning members 43 which are adjacent to each other in the stacking direction are bonded to each other. Moreover, the casing 42 and the cushioning members 43 which are adjacent to each other in the stacking direction are bonded to each other at end portions of the cushioning members 43. Thus, even when the layered body 41 contracts and expands repeatedly, gaps are hardly formed between the layered body 41 and the cushioning members 43 and between the casing 42 and the cushioning member 43. Therefore, air that passes through the dehumidifying element 2 easily flows to the layered body 41, and the dehumidification performance of the dehumidifying element 2 is thus improved.

Furthermore, according to Embodiment 1, the casing 42 and the end portions of the cushioning members 43 which are adjacent to each other in the end portion direction are in contact with each other such that the end portions of the cushioning members 43 are movable along the casing 42 in the stacking direction. Thus, when the layered body 41 expands in the stacking direction, each of the cushioning members 43 is pressed toward the casing 42 by the layered body 41, and entire part of the cushioning member 43 in the end portion direction moves evenly. Therefore, when the casing 42 holds the expanding layered body 41, a load thereof that holds the layered body 41 is also applied evenly to the entire part of the layered body 41 in the end portion direction. In such a manner, in the dehumidifying element 2, the load applied to the layered body 41 is distributed, and the probability with which the layered body 41 will be broken is thus reduced.

In addition, according to Embodiment 1, the end portions of the layered body 41 and the casing 42 which are adjacent to each other in the end portion direction are in contact with each other such that the end portions of the layered body 41 are movable along the casing 42 in the stacking direction. Thus, even the portions of the layered body 41 that are in contact with the casing 42 are movable in the stacking direction to the same degree as a central portion of the layered body 41 in the end portion direction. Therefore, when the layered body 41 expands and the casing 42 holds the expanding layered body 41, the load of holding the layered body 41 is applied evenly to part of the layered body 41 that is entire part thereof in the end portion direction. As described above, in the dehumidifying element 2, the load applied to the layered body 41 is distributed and the probability with which the layered body 41 will be broken is thus reduced.

Modification of Embodiment 1

Figure 3:
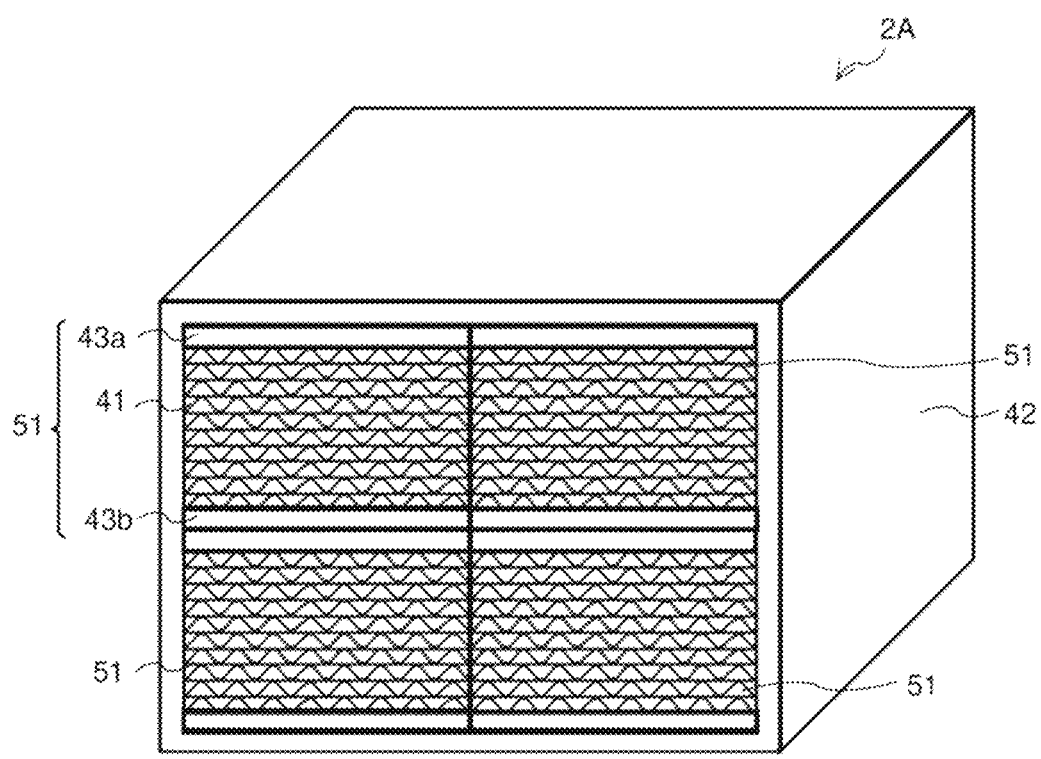
FIG. 3 is a perspective view of a dehumidifying element 2A according to a modification of Embodiment 1.

FIG. 3 is a perspective view of a dehumidifying element 2A according to a modification of Embodiment 1. As illustrated in FIG. 3, the dehumidifying element 2A includes a plurality of desiccant units 51 and the casing 42, which holds the desiccant units 51. The desiccant units 51 are arranged in the casing 42 such that two rows of desiccant units 51 are arranged in the up-down direction, and two desiccant units 51 of each of the two rows are arranged in the lateral direction.

Figure 4:
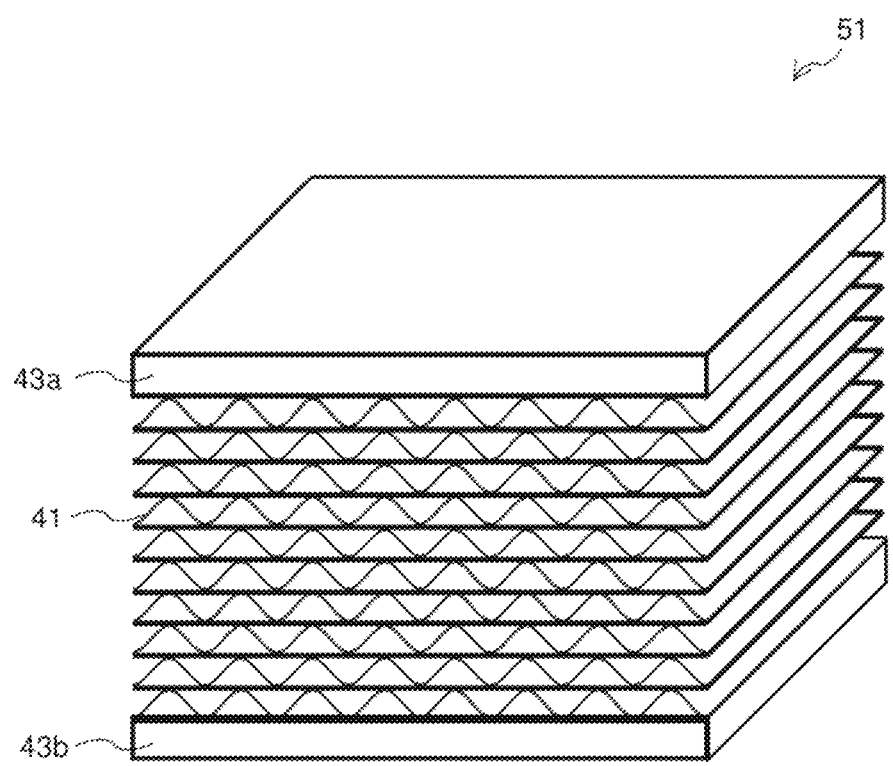
FIG. 4 is a perspective view of a desiccant unit 51 according to the modification of Embodiment 1.

FIG. 4 is a perspective view of each of the desiccant units 51 according to the modification of Embodiment 1. As illustrated in FIG. 4, the desiccant unit 51 includes the layered body 41 and the cushioning members 43 which are provided on both sides of the layered body 41 in the up-and-down direction. More specifically, the cushioning member 43a is bonded to the upper surface of the layered body 41, and the cushioning member 43b is bonded to the lower surface of the layered body 41. The casing 42 and the end portions of the cushioning members 43 which are adjacent to each other in the up-and-down direction are bonded to each other. The casing 42 maintains the outer shape of the entirety of the four desiccant units 51 in the up-and-down direction and the lateral direction.

In the desiccant units 51, of the cushioning members 43, cushioning members 43 adjacent to each other in the up-and-down direction are bonded to each other. Thus, no gaps are provided between the cushioning members 43 adjacent to each other in the up-and-down direction. Therefore, air that passes through the dehumidifying element 2A easily flows to each of the layered bodies 41, and the dehumidification performance of the dehumidifying element 2A is thus improved.

On the other hand, in the desiccant units 51, of the cushioning members 43, cushioning members 43 adjacent to each other in the lateral direction are not bonded to each other. Thus, in the desiccant units 51, when the layered bodies 41 expand and contract, the cushioning members 43 adjacent to each other in the lateral direction move in the up-and-down direction. In addition, in the desiccant units 51, of the layered bodies 41, layered bodies 41 adjacent to each other in the lateral direction are not bonded to each other. Thus, in the desiccant units 51, the layered bodies 41 adjacent to each other in the lateral direction move in the up-and-down direction, when the layered bodies 41 expand and contract. As described above, the layered body 41 of each of the desiccant units 51 moves independently of the other desiccant units 51, and is not compressed or elongated by the other desiccant units 51. Thus, the dehumidifying element 2A reduces the probability with which the layered body 41 will be broken by a cause other than moisture adsorption and desorption of the layered bodies 41.

It should be noted that in the desiccant units 51, of the cushioning members 43, one or both of cushioning members 43 adjacent to each other in the up-and-down direction may be omitted, and in this case also, cushioning members 43 adjacent to the casing 42 in the up-and-down direction expand and contract. Thus, also, when the layered body 41 of any of the desiccant units 51 expands, and presses the casing 42 in the up-and-down direction of the sheets, the force of pressing the casing 42 is lessened. That is, when the layered body 41 expands and the casing 42 holds the layered body 41, a load applied to the layered body 41 in the up-and-down direction of the sheets is reduced. Therefore, in the dehumidifying element 2, the probability with which the layered body 41 will be broken is reduced.

In addition, regarding the dehumidifying element 2A, in each of the desiccant units 51, the expansion and the contraction of the layered body 41 can be handled; that is, it can be handled in units of one desiccant unit 51. Thus, in the dehumidifying element 2A, the probability with which the entirety of the layered bodies 41 will be broken is further reduced. It should be noted that the desiccant units 51 may be arranged in only one of the up-and-down direction and the lateral direction. In addition, in each of the up-and-down direction and the lateral direction, three or more desiccant units 51 may be arranged.

Embodiment 2

Figure 5:
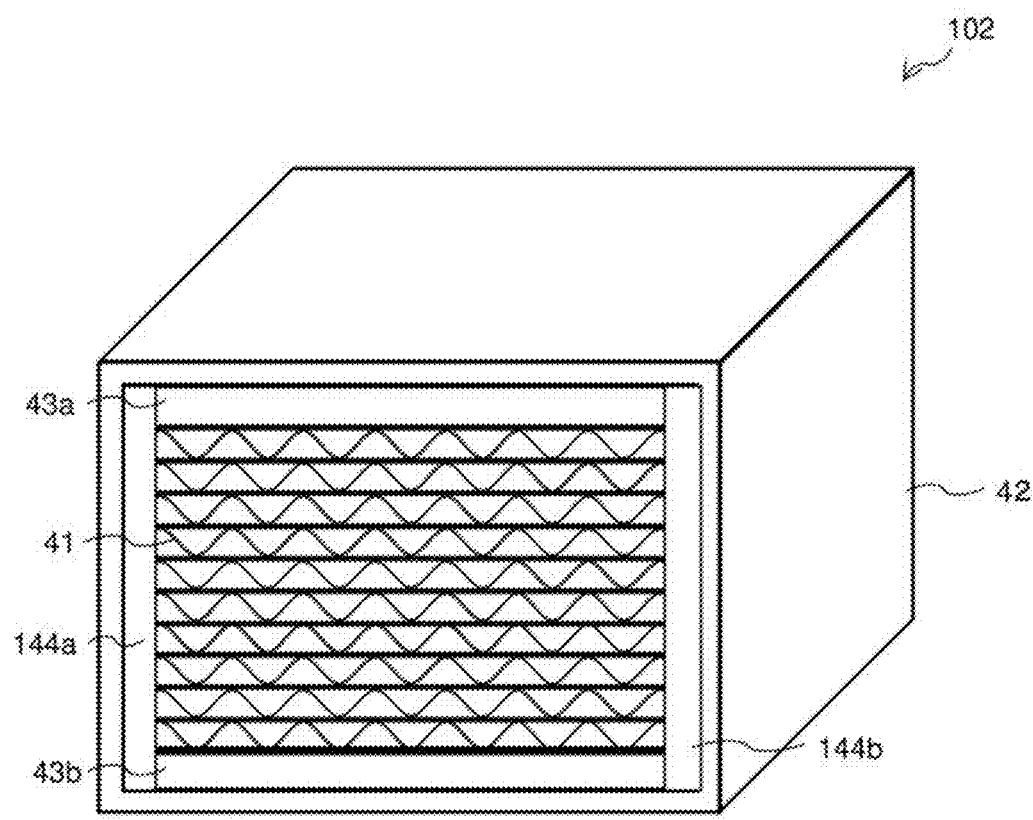
FIG. 5 is a perspective view of a dehumidifying element 102 according to Embodiment 2.

FIG. 5 is a perspective view of a dehumidifying element 102 according to Embodiment 2. In Embodiment 2, the dehumidifying element 102 includes holding members 144. In this regard, Embodiment 2 is different from Embodiment 1. Regarding Embodiment 2, components that are the same as those in Embodiment 1 will be denoted by the same reference signs, and their descriptions will thus be omitted. Embodiment 2 will be described by referring mainly to the differences between Embodiments 1 and 2.

As illustrated in FIG. 5, the dehumidifying element 102 includes a holding member 144a and a holding member 144b. It should be noted that "holding member 144" in the following description is a generic word for the holding member 144a and the holding member 144b. The dehumidifying element 102 is provided in the dehumidifying device 1 such that the stacking direction in the layered body 41 coincides with the up-and-down direction of the dehumidifying device 1. In addition, regarding the dehumidifying element 102, the positions of the cushioning members 43 and those of the holding members 144 are adjusted such that the cushioning members 43 and the holding members 144 are not in contact with and do not interfere with the first air passage 3 or the second air passage 4.

Each of the holding members 144 has stretchability. The holding member 144a is provided between the layered body 41 and the casing 42 in the lateral direction and is bonded to the casing 42. More specifically, the holding member 144a is provided on a left side portion of the layered body 41, and a left end portion of the holding member 144a is bonded to an inner surface of a left side portion of the casing 42. The holding member 144b is provided on a right side portion of the layered body 41, and a right end portion of the holding member 144b is bonded to an inner surface of a right side portion of the casing 42. It should be noted that each of the holding members 144 may be bonded to part of the layered body 41 that is adjacent to the holding member 144 in the lateral direction. In addition, it is not indispensable that an end portion of the holding member 144 is bonded to the part of the casing 42 that is adjacent to the holding member 144 in the lateral direction.

As describe above, the layered body 41 easily expands in the up-and-down direction. However, since the layered body 41 expands and contracts repeatedly, in the layered body 41, a load applied in the lateral direction is also accumulated. Because of the stretchability of the holding member 144, when the layered body 41 presses the casing 42 in the lateral direction, the holding member 144 lessens the pressing force acing on the casing 42. The holding member 144a contracts and expands in accordance with the leftward expansion and the contraction of the layered body 41. The holding member 144b contract and expands in accordance with the rightward expansion and the contraction of the layered body 41. It should be noted that regarding the holding member 144, only one of the holding member 144a, which is provided on the left side portion of the layered body 41, and the holding member 144b, which is provided on the right side portion of the layered body 41, may be provided.

In the layered body 41, the load applied in the end portion direction is smaller than the load applied in the stacking direction. Thus, the material, the shape, or the dimensions of the holding member 144 are adjusted such that the holding member 144 has lower stretchability than that of the cushioning member 43. For example, when being made of a material having a higher rate of expansion and contraction than that of the cushioning member 43, the holding member 144 is formed to have such a shape or dimensions as to have a lower rate of expansion and contraction, whereby the stretchability of the holding member 144 is adjusted to be lower than that of the cushioning member 43.

The holding member 144 is not bonded to the layered body 41. In addition, a surface of the holding member 144 that is in contact with the layered body 41 is smoothed to prevent the adsorbent of the layered body 41 and fibers of the sheets from getting in the surface of the holding member 144. Thus, the layered body 41 slides along the holding member 144 in the stacking direction in accordance with the expansion and the contraction of the layered body 41. It should be noted that the material of the surface of the holding member 144 that is in contact with the layered body 41 may be changed to a material having high slidableness. In addition, it is not indispensable that the surface of the holding member 144 that is in contact with the layered body 41 is smoothed. However, the layered body 41 and the holding member 144 may be bonded to each other.

The holding member 144 has a low air permeability. In addition, the air permeability of the holding member 144 does not change even when the holding member 144 expands and contracts. This reduces a decrease in the dehumidification performance of the dehumidifying element 2, because air passages through the holding member 144, which does not contribute to dehumidification. It should be noted that the holding member 144 may have hygroscopicity.

Method of Manufacturing Dehumidifying Element 102

Next, a method of manufacturing the dehumidifying element 102 will be described. First, a layered-body preparing step of preparing the layered body 41 having the wavy sheets and the planar sheets that are stacked on one another is carried out. Next, a first bonding step of bonding the cushioning member 43a to the upper surface of the layered body 41 is carried out. Subsequently, a second bonding step of bonding the cushioning member 43b to the lower surface of the layered body 41 is carried out. Then, in a state in which the holding members 144 are provided at the left side portions of the layered body 41 and the cushioning members 43 and at the right side portions of the layered body 41 and the cushioning members 43, a setting and bonding step of setting the layered body 41, the cushioning members 43, and the holding members 144 in the casing 42 is carried out. At this time, the casing 42 and the cushioning members 43 are bonded to each other. In such a manner, the dehumidifying element 102 is manufactured. It should be noted that the sequence of the first bonding step and the second bonding step may be changed appropriately.

It should be noted that when the cushioning members 43 are not bonded to the layered body 41 or to the casing 42, subsequent to the layered-body preparing step, a layered body setting step of setting only the layered body 41 in the casing 42 is carried out. Next, a first cushioning-member setting step of setting one of the cushioning members 43 on the upper surface of the layered body 41 is carried out. Subsequently, a second cushioning-member setting step of setting the other cushioning member 43 on the lower surface of the layered body 41 is carried out. Then, a first holding-member setting step of setting the holding member 144a on the left side portion of the layered body 41 is carried out. Finally, a second holding-member setting step of setting the holding member 144b on the right side portion of the layered body 41 is carried out. In such a manner, the dehumidifying element 102 is manufactured. It should be noted that the sequence of the first cushioning-member setting step and the second cushioning-member setting step may be changed appropriately.

In Embodiment 2, each of the holding members 144 is provided between the casing 42 and the layered body 41 in the stacking direction. Thus, when the layered body 41 expands and the casing 42 holds the expanding layered body 41, the load applied to the layered body 41 in the end portion direction is reduced. Therefore, in the dehumidifying element 102, the probability with which the layered body 41 will be broken is reduced.

According to Embodiment 2, the layered body 41 and each holding member 144 which are adjacent to each other in the end portion direction are in contact with each other such that the end portions of the layered body 41 are movable along the holding member 144 in the stacking direction. Thus, even the portion of the layered body 41 that is in contact with the holding member 144 is movable in the stacking direction to the same degree as the central portion of the layered body 41 in the end portion direction. Therefore, when the layered body 41 expands and the casing 42 holds the expanding layered body 41, such a holding load is also applied evenly to the layered body 41 throughout the entire part of the layered body 41 in the end portion direction. In such a manner, in the dehumidifying element 2, since the load applied to the layered body 41 is distributed, the probability with which the layered body 41 will be broken is reduced.

In addition, according to Embodiment 2, the layered body 41 slides along the holding member 144 in the stacking direction in accordance with the expansion and the contraction of the layered body 41. Thus, deterioration of the layered body 41 that would be caused by friction is reduced.

It should be noted that if the dehumidifying element 102 is provided in the dehumidifying device 1, for example, such that the stacking direction coincides with the lateral direction of the dehumidifying device 1, the force of the layered body 41 that presses the holding members 144 downward is enhanced under the influence of gravity. At this time, the portions of the layered body 41 that are in contact with the holding members 144 cannot be easily moved in the stacking direction. In Embodiment 2, the dehumidifying element 102 is provided in the dehumidifying device 1 such that the stacking direction coincides with the up-and-down direction of the dehumidifying device 1. Thus, the portions of the layered body 41 that are in contact with the holding members 144 can be easily moved in the stacking direction to the same degree as the central portion of the layered body 41 in the end portion direction.

Modification of Embodiment 2

Figure 6:
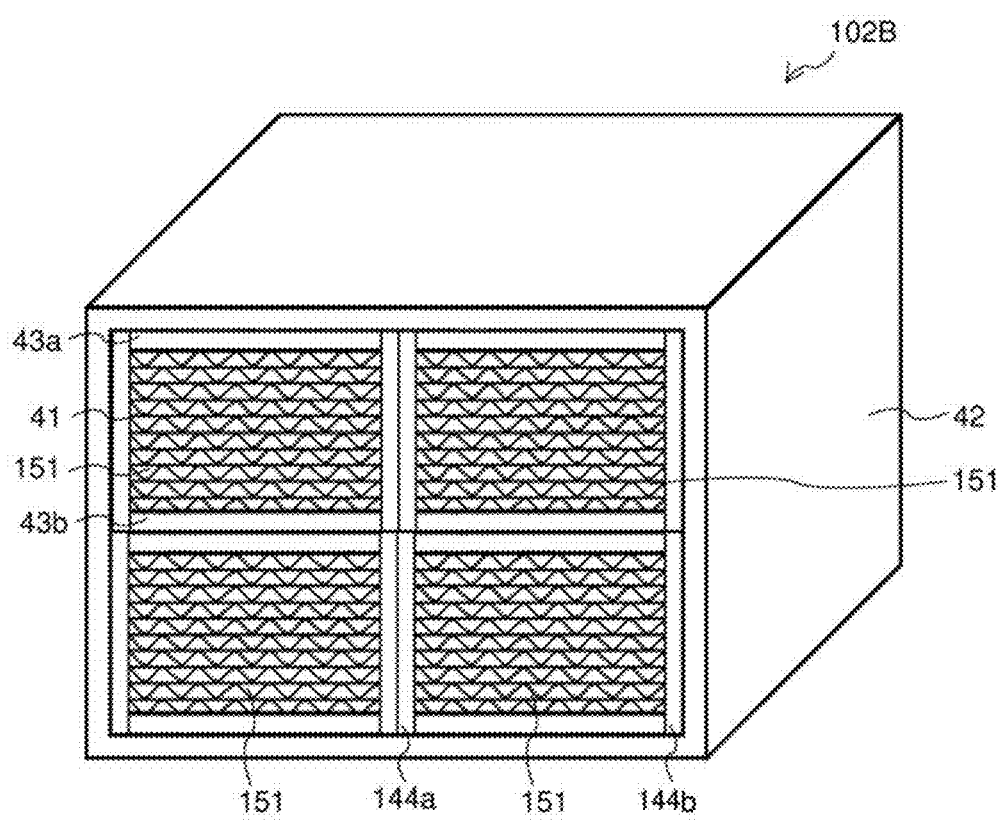
FIG. 6 is a perspective view of a dehumidifying element 102A according to a modification of Embodiment 2.

FIG. 6 is a perspective view of a dehumidifying element 102A according to a modification of Embodiment 2. As illustrated in FIG. 6, the dehumidifying element 102A includes a plurality of desiccant units 151 and the casing 42, which holds the desiccant units 151. The plurality of desiccant units 151 are arranged in the casing 42 such two rows of desiccant units 151 are arranged in the stacking direction, and two desiccant units 151 of each of the two rows are arranged in the end portion direction. The casing 42 maintains the outer shape of the entirety of the four desiccant units 151 in the up-and-down direction and the lateral direction.

Figure 7:
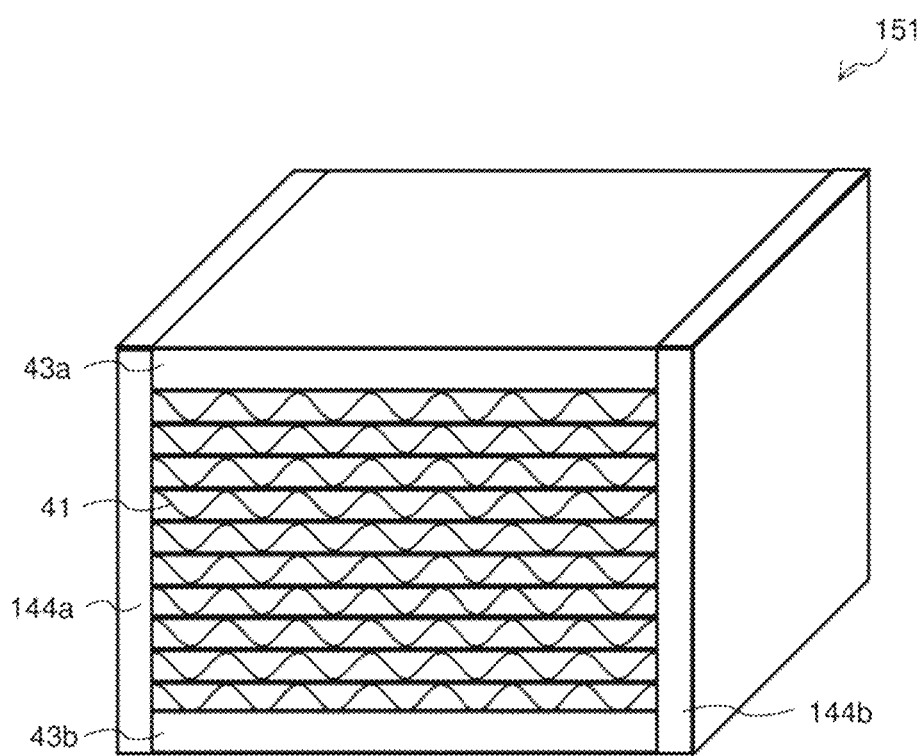
FIG. 7 is a perspective view of a desiccant unit 151 according to the modification of Embodiment 2.

FIG. 7 is a perspective view of each of the desiccant units 151 according to the modification of Embodiment 2. As illustrated in FIG. 7, the desiccant unit 151 includes the layered body 41, the cushioning members 43 which are provided on both sides of the layered body 41 in the up-and-down direction, and the holding members 144 which are provided on both sides of the layered body 41 in the lateral direction. In each of the desiccant units 51, the layered body 41 and each of the cushioning members 43 are bonded to each other. The casing 42 and the end portion of each cushioning member 43 which are adjacent to each other in the up-and-down direction are bonded to each other. The casing 42 and the end portion of each holding member 144 which are adjacent to each other in the lateral direction are bonded to each other.

In the desiccant units 151, of the cushioning members 43, cushioning members 43 adjacent to each other in the up-and-down direction are bonded to each other; and of the holding members 144, holding members 144 adjacent to one each other in the up-and-down direction are bonded to each other, and holding members 144 adjacent to each other in the lateral direction are bonded to each other. In such a manner, no gap is provided between any adjacent two of the desiccant units 151. Therefore, air that passes through the dehumidifying element 102A easily flows to the layered body 41, and the dehumidification performance of the dehumidifying element 102A is thus improved.

In the dehumidifying element 102A, in each of the desiccant unit 151, the expansion and the contraction of the layered body 41 can be handled; that is, it can be handled in units of one desiccant unit. Thus, in the dehumidifying element 102A, the probability with which the layered body 41 will be broken is further reduced. It should be noted that the desiccant units 151 may be arranged in only one of the up-and-down direction and the lateral direction. In addition, in each of the up-and-down direction and the lateral direction, three or more desiccant units 151 may be arranged.

REFERENCE SIGNS LIST

1: dehumidifying device, 2: dehumidifying element, 2A: dehumidifying element, 2a: first dehumidifying element, 2b: second dehumidifying element, 3: first air passage, 4: second air passage, 5: first inflow port, 6: first outflow port, 7: second inflow port, 8: second outflow port, 9: outside air duct, 10: air-supply duct, 11: return air duct, 12: exhaust duct, 21: air-supply fan, 22: exhaust fan, 31: first air, 32: second air, 41: layered body, 42: casing, 43: cushioning member, 51: desiccant unit, 102: dehumidifying element, 102A: dehumidifying element, 144: holding member, 151: desiccant unit

The invention claimed is:

1. A dehumidifying element comprising:
a layered body in which a plurality of sheets supporting an adsorbent that dehumidifies air are stacked on one another, with gaps provided between adjacent ones of the plurality of sheets, the gaps allowing air to pass therethrough;
a casing that holds the layered body; and
a cushioning member provided between the casing and the layered body in a stacking direction in which the plurality of sheets are stacked on one another, the cushioning member being configured to expand and contract.

2. The dehumidifying element of claim 1, wherein the casing holds the layered body in the stacking direction.

3. The dehumidifying element of claim 1, wherein the cushioning member is included in at least two identical cushioning members each being provided on a side of the layered body in the stacking direction.

4. The dehumidifying element of claim 1, further comprising:
a holding member provided between the casing and the layered body in an end portion direction that is orthogonal to the stacking direction, the holding member being configured to expand and contract, the holding member having lower stretchability than that of the cushioning member.

5. The dehumidifying element of claim 4,
wherein the layered body and the holding member are adjacent to each other in the end portion direction, and are in contact with each other such that the layered body is movable along the holding member in the stacking direction, and
wherein the casing and an end portion of the holding member are adjacent to each other in the end portion direction and are bonded to each other.

6. The dehumidifying element of claim 5, wherein the layered body and the holding member are in contact with each other such that the layered body is slidable along the holding member.

7. The dehumidifying element of claim 1, wherein
the cushioning member is included in at least two identical cushioning members each being provided on a side of the layered body in the stacking direction, and
the layered body and the at least two identical cushioning members are included in a desiccant unit of a plurality of desiccant units held in the casing, the plurality of desiccant units being arranged in the stacking direction or an end portion direction that is orthogonal to the stacking direction, and the layered bodies and cushioning members in each desiccant unit are identical.

8. The dehumidifying element of claim 7, wherein each of the plurality of desiccant units includes an identical holding member provided on each side of a corresponding one of the layered bodies in the end portion direction, each holding member being configured to expand and contract, the holding member having lower stretchability that that of the cushioning member.

9. The dehumidifying element of claim 8, wherein in the desiccant units, of the holding members, holding members adjacent to each other in the stacking direction are bonded to each other, and holding members adjacent to each other in the end portion direction are bonded to each other.

10. The dehumidifying element of claim 7,
wherein in the plurality of desiccant units,
of the cushioning members, cushioning members adjacent to each other in the stacking direction are bonded to each other, and cushioning members adjacent to each other in the end portion direction are in contact with each other in such a manner as to be movable independently of each other in the stacking direction, and
of the layered bodies, layered bodies adjacent to each other in the end portion direction are in contact with each other in such a manner as to be movable independently of each other in the stacking direction.

11. The dehumidifying element of claim 1,
wherein the layered body and the one cushioning member are adjacent to each other in the stacking direction and are bonded to each other, and
wherein the casing and an end portion of the cushioning member are adjacent to each other in the stacking direction and are bonded to each other.

12. The dehumidifying element of claim 1, wherein the casing holds the layered body in an end portion direction that is orthogonal to the stacking direction.

13. The dehumidifying element of claim 12, wherein an end portion of the cushioning member is adjacent to the casing in the end portion direction and is in contact with the casing in such a manner as to be movable along the casing in the stacking direction.

14. The dehumidifying element of claim 12, wherein an end portion of the layered body is adjacent to the casing in the end portion direction and is in contact with the casing in such a manner as to be movable along the casing in the stacking direction.

15. The dehumidifying element of claim 1, wherein the plurality of sheets include a plurality of wavy sheets and a plurality of planar sheets, and the layered body is configured such that the plurality of wavy sheets and the plurality of planar sheets are alternately stacked on one another.

16. The dehumidifying element of claim 1, wherein a dimension of the casing in an air-flow direction in which air passes is larger than or equal to a dimension of the layered body in the air-flow direction at time at which the layered body most greatly expands.

17. A dehumidifying device comprising:
a first air passage through which air flows from one of an indoor side and an outdoor side to the other;
a second air passage through which air passes from the other of the indoor side and the outdoor side to the one of the indoor side and the outdoor side; and
dehumidifying elements identical to the dehumidifying element of claim 1, and provided in the first air passage and the second air passage, the dehumidifying device being configured to change a flow direction of air that flows through the first air passage and a flow direction of air that flows through the second air passage.

18. A method of manufacturing a dehumidifying element, the method comprising:

preparing a layered body in which a plurality of sheets supporting an adsorbent that dehumidifies air are stacked on one another;

setting the layered body in a casing that holds the layered body; and setting a cushioning member configured to expand and contract, between the casing and the layered body in a stacking direction in which the plurality of sheets are stacked on one another.

19. The method of manufacturing the dehumidifying element of claim 18, wherein the setting the cushioning member includes carrying out a first cushioning-member setting in which a first cushioning member is set between the casing and the layered body and on one side in the stacking direction, and carrying out a second cushioning-member setting in which a second cushioning member is set between the casing and the layered body and on an other side in the stacking direction.

* * * * *